United States Patent [19]

Smith et al.

[11] 4,411,859

[45] Oct. 25, 1983

[54] GAMMA SENSOR HAVING COMBINED THERMAL BRIDGE AND CENTERING MEANS

[75] Inventors: Robert D. Smith, Bethesda, Md.; Pierre Regazzoni, Boulonge-Billancourt, France

[73] Assignee: Scandpower, Inc., Bethesda, Md.

[21] Appl. No.: 267,912

[22] Filed: May 28, 1981

Related U.S. Application Data

[63] Continuation-in-part of Ser. No. 48,033, Jun. 13, 1979, Pat. No. 4,356,061.

[51] Int. Cl.³ .............................................. G21C 17/00
[52] U.S. Cl. ..................................... 376/247; 136/230; 376/208
[58] Field of Search ................. 376/247; 374/208, 210, 374/247; 136/230

[56] References Cited

U.S. PATENT DOCUMENTS

| | | | |
|---|---|---|---|
| 2,156,826 | 5/1939 | Ullman | 374/208 |
| 3,597,316 | 8/1971 | Lynworth | 376/247 |
| 4,001,045 | 1/1977 | Smith | 136/230 |
| 4,060,094 | 11/1977 | McAinish | 136/230 |
| 4,313,792 | 2/1982 | Smith | 376/247 |

*Primary Examiner*—Sal Cangialosi
*Attorney, Agent, or Firm*—Eric P. Schellin

[57] ABSTRACT

A gamma sensor is supported coaxially in a bore, extending through the core of a nuclear reactor, by centering means which span the annular space between the gamma sensor and the bore. Said centering means also acts as a thermal bridge so that the portion of the gamma sensor contacted by the centering means will assume a thermal temperature close to that of the bore. Since poor thermal contact between the gamma sensor and the bore is thereby avoided, the accuracy of sensor readings is improved.

10 Claims, 10 Drawing Figures

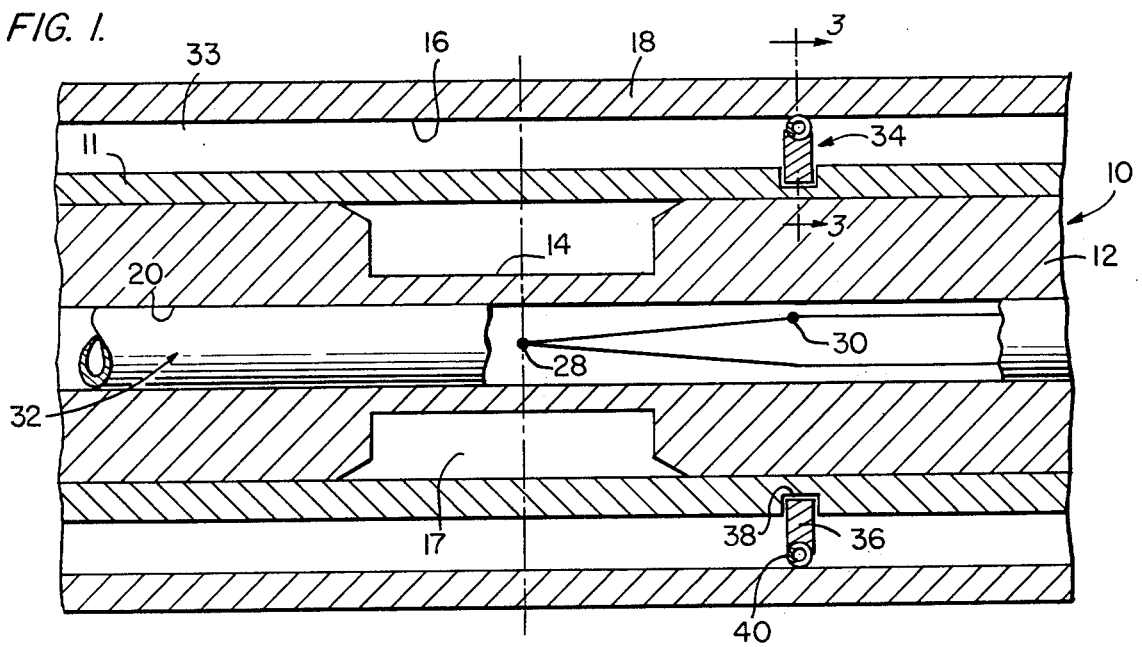
FIG. 1.
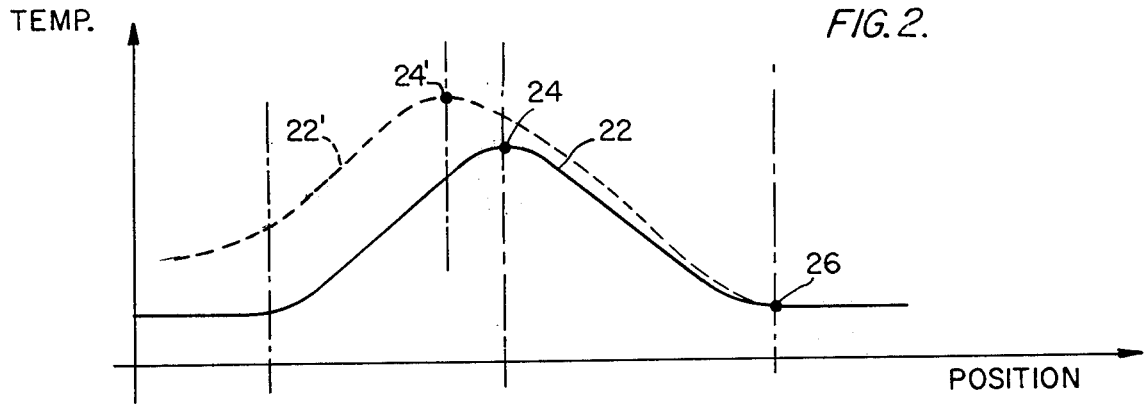
FIG. 2.
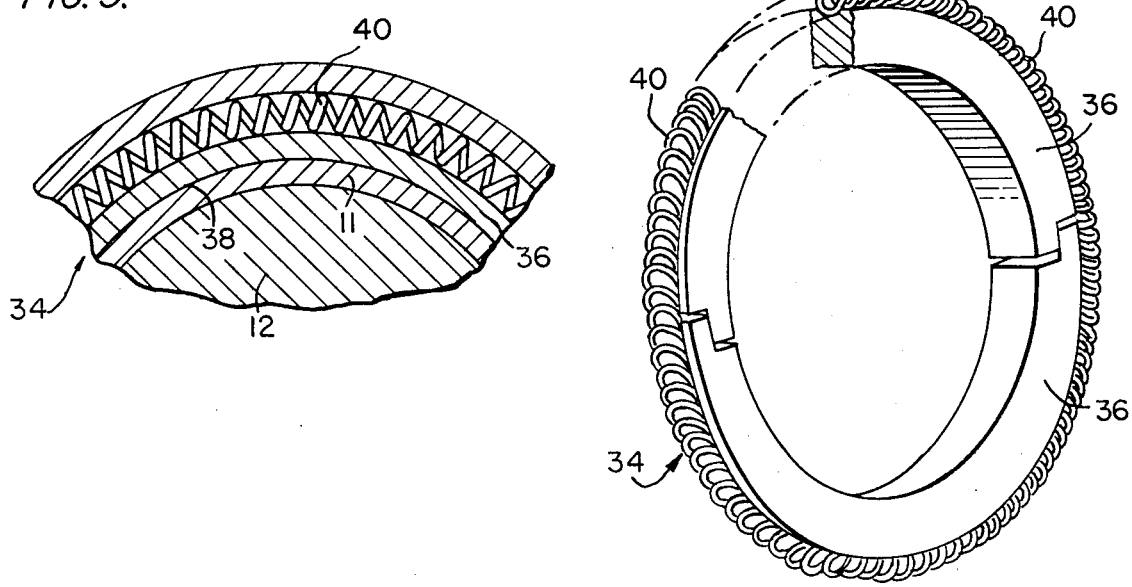
FIG. 3.
FIG. 4.

GAMMA SENSOR HAVING COMBINED THERMAL BRIDGE AND CENTERING MEANS

BACKGROUND OF THE INVENTION

The present invention relates to improvements in a gamma sensor of the type disclosed in prior application Ser. No. 888,881, filed Mar. 21, 1978 of Rolstad et. al., now U.S. Pat. No. 4,298,430 and owned in common with the present application by the same assignee; and further, this application is a continuation-in-part of prior copending application, Ser. No. 48,033, filed June 13, 1979, now U.S. Pat. No. 4,356,061.

Gamma sensors, such as are used to measure the heat rate of nuclear reactors, depend upon the heating of a thermally isolated heater body by gamma rays. The heat so generated is proportional to the specific power output of the nearby fuel rods. To measure the heat generated in the heater body, it is permitted to escape to a sink through a controlled heat path of closely held dimensions. The temperature drop along such heat path is directly proportional to heat rate (watts/gm) in the heater body and therefore proportional to power in adjoining fuel rods. A thermocouple, or thermocouples, arranged to measure the temperature drop along the controlled heat path produces a signal proportional to this power. This temperature drop and the signal are not greatly affected by the temperature of the heat sink. However, when the temperature of the heat sink changes by a considerable amount, say 50° C., then there is a corresponding and noticeable second order change in the thermal conductivity of the controlled heat path, which is reflected as a change in the temperature drop and as an error in the signal output; even though the gamma ray flux is constant.

The gamma sensor disclosed in the aforementioned application gives very accurate measurements when the bore into which it is inserted is that of an unfueled guide tube of a nuclear reactor through which coolant circulates rapidly. In such an installation, it follows that the outer sheath of the sensor will have a fairly well defined temperature. The readings of the gamma sensor will therefore be accurate enough, or cn accurately be corrected to take care of the aforementioned second order change in thermal conductivity of the heat path with changes in the temperature of the outer sheath of the gamma sensor, which outer sheath acts as a heat sink. However, when such gamma sensor is inserted into a dry bore of a nuclear reactor fuel core, the outer sheath of the sensor may assume a non-uniform temperature, depending upon whether the portion of the outer sheath in question touches or does not touch the bore. Those portions of the outer sheath which touch the bore will be kept cool by the contact, while those portions which bridge the bore will heat up from the gamma ray flux.

SUMMARY OF THE INVENTION

In the present invention a centering device spans the annular gap between the gamma sensor and the bore into which it is inserted. The centering device has the dual function of providing a thermal bridge at the correct spot on the gamma sensor for a heatsink and of centering the gamma sensor in the bore of the fuel core or guide tube into which it is inserted.

In accordance with certain embodiments of the invention, the centering device is a separate elastically deformable element mounted externally on the outer sheath of the sensor and in thermal contact therewith by means of an annular groove, for example, to also engage the internal bore surface of the fuel core or guide tube. The centering device is axially located on the sensor within the cold region of the heater body close to the boundary of an adjacent hot region which is coextensive with the thermal resistance gap portion of the heater body having a reduced diameter. Thus, the centering device may be aligned with the cold junction of the differential thermocouple associated with the sensor at an axial location coinciding with a flat portion of the axial temperature gradient. Development of any asymmetrical temperature gradient is thereby avoided by preventing any unintended thermal conduction between the outer sheath and the bore surface.

In accordance with another embodiment of the invention, the outer sheath of the gamma sensor is radially deformed from a circular cross-section to establish a thermally conductive path by thermal contact with the heater body and the bore surface of the guide tube along the cold regions as well as to function as a centering means.

BRIEF DESCRIPTION OF DRAWING FIGURES

FIG. 1 is a partial longitudinal section view of one type of in-place gamma sensor with which the present invention is associated.

FIG. 2 is a graph showing axial temperature distribution along such an in-place gamma sensor.

FIG. 3 is a partial transverse section view taken substantially through a plane indicated by section line 3—3 in FIG. 1.

FIG. 4 is a perspective view of the thermal bridge and centering means associated with the sensor shown in FIGS. 1-3.

Figure 9:
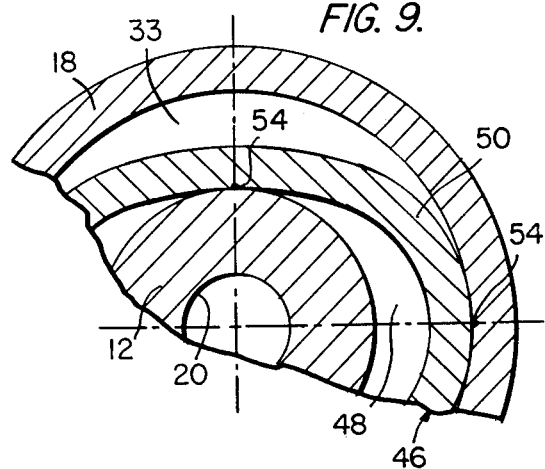
Figure 8:
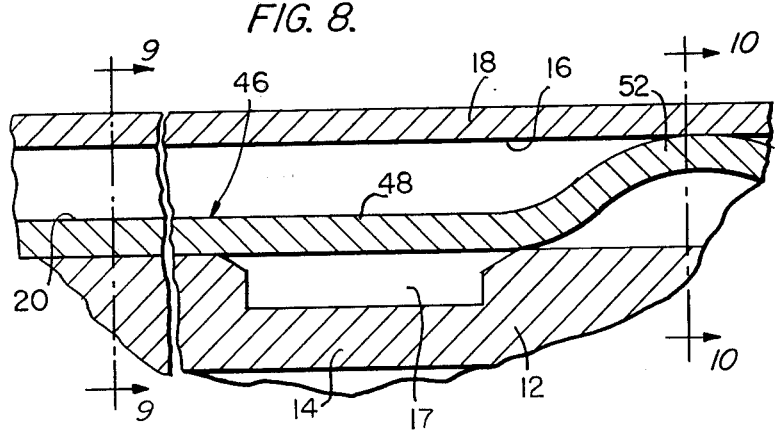
FIG. 8 is a partial longitudinal section view showing another embodiment of the present invention.
Figure 10:
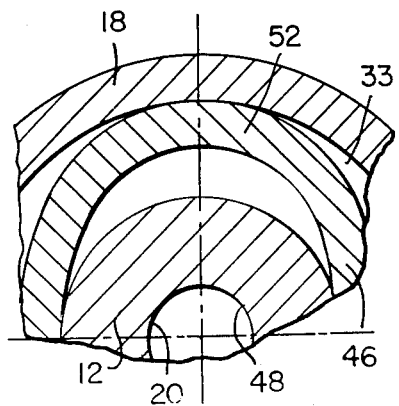

FIGS. 9 and 10 are partial transverse section views taken substantially through planes indicated by section lines 9—9 and 10—10 in FIG. 8.

DETAILED DESCRIPTION

Referring now to the drawings in detail, FIG. 1 illustrates a gamma sensor 10 of the type disclosed in the aforementioned prior U.S. Pat. No. 4,298,430. The sensor has an outer sheath 11 enclosing an elongated metallic heater body 12 that is generally cylindrical in shape and of a constant outer diameter except along reduced diameter portions 14 at axially spaced measurement zones of the sensor, one of which is shown.

Under the influence of an ambient gamma ray flux, the cylindrical body 12 is heated. The heat so generated along the larger diameter portion of the body can escape radially outward, to sheath 11 and then to the ambient surround, such as flowing reactor coolant or the dry bore 16 of an instrument tube 18. However, the heat generated in portion 14 can not escape radially outward, since the axial gap space 17 forms a thermal resistance. Heat must therefore escape by flowing longitudinally along portion 14 and then radially on either axial side thereof. Accordingly, portion 14 forms a hot region as compared to cold regions on either axial side thereof. A temperature plot or gradient taken along the axis of bore 20 of the body 12 when the sheath 11 is uniformly cooled to a constant temperature, would have the characteristic indicated by curve 22 in the graph of FIG. 2. The temperatures of the hot spot 24 and a cooler spot 26 as shown on curve 22, are sensed by a differential thermocouple 32 with hot junction 28 and cold junction 30 as shown in FIG. 1. The electrical output of the thermocouple is directly dependent on the thermal gradient and is a measure of the gamma ray flux.

The sheath 11 would be uniformly cooled to a known temperature if surrounded on all sides with flowing reactor coolant. If the gamma sensor is inserted into a dry instrument tube, some parts of the sheath may bridge the small annular gap 33 between the sheath 11 and the bore 16 of the instrument tube and make poor thermal contact with the instrument well and thereby disturb the symmetrical heat distribution depicted by curve 22 in FIG. 2.

For example, if a portion of the sheath 11 were in poor thermally conductive relation to the tube 18, the temperature plot, taken along the axis of the gamma sensor for the same gamma ray flux as before is shown by dotted line 22' in FIG. 2. It will be seen from curve 22' that its peak 24' is not aligned with the hot junction 28 so that the differential temperature signal output of the thermocouple will be in error. To avoid such signal error, establishment of poor thermally conductive thermal condition between sheath and instrument tube is precluded by providing a centering device 34 for each measurement zone as shown in FIG. 1.

The centering device 34 as more clearly seen in FIGS. 3 and 4 includes a pair of split ring sections 36 seated within an annular mounting groove 38 on sheath 11. The fact that two ring sections are separable permits them to be inserted into the groove in touching contact with each other. A spring 40 made of a helix with the two ends hooked together, is stretched over the circumferential groove about the exterior edge of the ring sections. The bias of spring 40 holds the ring sections in place. The springiness of the individual turns of spring 40 permits the turns thereof to conform to the shape and diameter of bore 16 over any foreseeable variation in bore size. Since the turns of spring 40 press tightly against the ring sections and bore 16, the thermal resistance between sheath 11 and bore is considerably decreased, compared to that between a bore and a sheath loosely lying within. Furthermore, if the bore is a wet bore, flow of reactor coolant therealong is not significantly hindered, since the fluid can flow along the bore by passing between successive turns of the helix spring 40.

Each centering device 34 is located by means of the mounting groove 38 as close as possible to the hot thermal resistance gap 18 but sufficiently spaced therefrom to correspond to a flat portion of the resulting axial temperature gradient on curve 22 shown in FIG. 2 at point 26, which may also be aligned with the cold junction 30 of the thermocouple. Such location of the centering device will insure that there is no disturbance of the symmetrical characteristic of curve 22 because of poor thermal contact between sheath 11 and tube 18.

Figure 5:
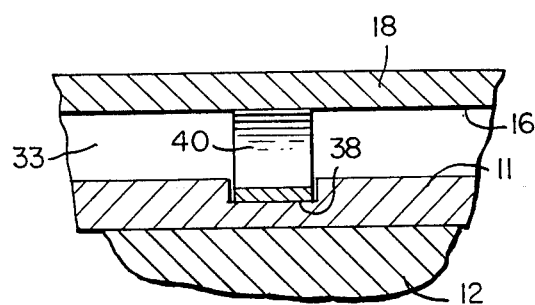
FIG. 5 is a partial longitudinal section view of a gamma sensor in a bore having another form of centering device.
Figure 6:
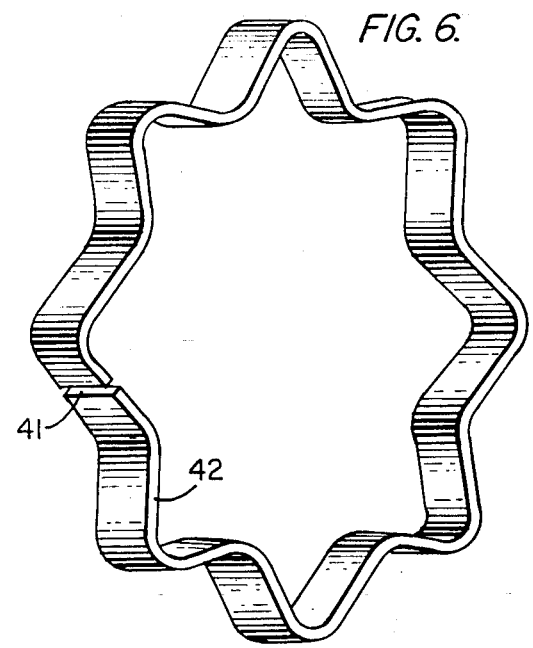
FIG. 6 is a perspective view of the thermal bridge and centering means shown in FIG. 5.

FIGS. 5 and 6 illustrate an embodiment of the invention in which a centering device in the form of a ribbon spring 42 is snapped into groove 38 in sheath 11. The ribbon spring is provided with a split 41 so that it can be spread over the larger diameter of sheath 11. In other respects the gamma sensor of FIG. 5 is similar to that of FIG. 1. While the thermal resistance of the thermal bridge of spring 42 is somewhat higher than that of centering device 34 hereinbefore described, it is adequate for many applications and simpler in construction. The ribbon spring 42 also will not obstruct the longitudinal flow of reactor coolant.

Figure 7:
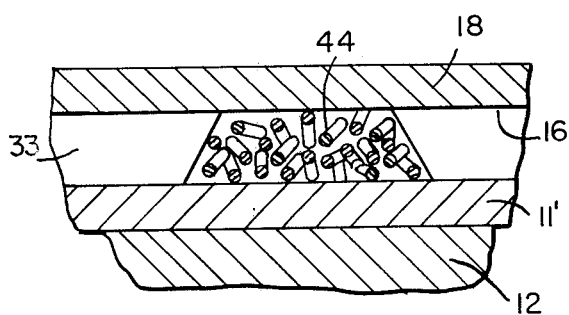
FIG. 7 is a partial longitudinal section view of a gamma sensor in an instrument tube, having yet another form of thermal bridge and centering means.

FIG. 7 illustrates another embodiment wherein the thermal bridge is made of a springy mass 44 of tubular knitted fabric of very fine stainless steel wire. The knitted tube is collapsed to 30% density, thereby forming a sponge-like sleeve, similar to those used to demist compressed gases. The sponge-like sleeve is slipped over the sheath 11' of a gamma sensor and welded into place. The springy mass 44 will reduce the thermal resistance between sheath 11' and bore 16 and will also permit longitudinal flow of reactor coolant. The embodiment of FIG. 4 has the obvious advantage that the thermal bridge is fixed to the gamma sensor.

FIGS. 8, 9, and 10 illustrate another embodiment which provides for good thermal contact between a sheath generally referred to by reference numeral 46 and bore 16 while providing for good centering of the sheath within the bore and permitting longitudinal flow of reactor coolant.

As in other embodiments, the sheath 46 is in contact with the cold regions of the heater body for cooling thereof. At portions 48 of the sheath 46 enclosing the gaps 17, the sheath is cylindrical while along portions 50 and 52 it is deformed into an ellipsoid, the major exterior dimension of which contacts the body 12. Along alternate axially spaced portions 50 and 52, the sheath 46 is deformed in perpendicular directions.

Because of the sliding fit, there is good thermal contact between the sheath 46 and bore 16. At the same time, the thermal resistance gaps 17 are enclosed by the sheath 46 to preserve its isolation. Good contact is established at major and minor axis points 54 and 56 as shown in FIG. 9 so that 90° spaced portions of the bore and heater body are engaged to provide a better centering action. Except for the enlarged portions 50 and 52, the sheath 46 is cylindrical and in thermal contact with the cold regions. It will be apparent that the thermal bridge afforded by this form of construction is very rugged.

The thermal bridges and centering means described herein are useful not only in combination with gamma sensors, which are generally used while fixed in place, but are also useful with the traveling type of gamma thermometers, which are used for scanning operations.

We claim:

1. For use with a gamma sensor positioned within a tubular guide of a fuel assembly in a nuclear reactor, said sensor having an elongated gamma heated body provided with relatively hot and cold regions and an outer sheath in thermal contact with said body along the cold region thereof to establish axially symmetrical heat distribution therein in response to uniform external cooling of the outer sheath within an annular gap between said outer sheath and the tubular guide, the improvement residing in thermal bridge means engageable with the tubular guide within the annular gap for establishing a thermally conductive path between the outer sheath and the tubular guide, and means restrictively mounting the thermal bridge means on the outer sheath in axially spaced adjacency to the hot region of the body for preventing disturbance of said symmetrical heat distribution.

2. The improvement as defined in claim 1 wherein said thermal bridge means includes a centering element in sliding contact with the tubular guide.

3. The improvement as defined in claim 2 wherein said thermal bridge means further includes at least two separable ring sections on which the centering element is supported.

4. The improvement as defined in claim 3 wherein said centering element is a helical spring.

5. The improvement as defined in claim 4 wherein said mounting means includes an annular groove formed in the outer sheath within which the ring sections are seated.

6. The improvement as defined in claim 2 wherein said mounting means includes an annular groove formed in the outer sheath within which the centering element is seated.

7. The improvement as defined in claim 6 wherein said centering element is a split, undulating ribbon spring.

8. The improvement as defined in claim 2 wherein said centering element is a metal wire fabric.

9. In combination with a gamma sensor positioned within a tubular guide of a fuel assembly in a nuclear reactor, said sensor having an elongated gamma radiation heated body provided with relatively hot and cold regions and an outer sheath in thermal contact with said body along the cold regions thereof to establish axially symmetrical heat distribution therein in response to uniform external cooling of the outer sheath within an annular gap between said outer sheath and the tubular guide, the improvement residing in thermal bridge means engageable with the tubular guide within the annular gap for establishing a thermally conductive path between the outer sheath and the tubular guide, said thermal bridge means being formed by portions of the outer sheath radially deformed into thermal contact with the tubular guide at a location in axially spaced adjacency to the hot region of the body for preventing disturbance of said symmetrical heat distribution.

10. For use with a gamma sensor positioned within a tubular guide of a fuel assembly in a nuclear reactor, said sensor having an elongated gamma radiation heated body provided with relatively hot and cold regions and an outer sheath in thermal contact with said body along the cold region thereof to establish axially symmetrical heat distribution therein in response to uniform external cooling of the outer sheath within an annular gap between said outer sheath and the tubular guide, the improvement residing in thermally conductive centering means projecting from the outer sheath through the gap into sliding contact with the tubular guide only at an axial location on the body in spaced adjacency to the hot region.

* * * * *